United States Patent
Spencer et al.

(10) Patent No.: US 10,613,985 B2
(45) Date of Patent: Apr. 7, 2020

(54) BUFFER MANAGEMENT IN A DATA STORAGE DEVICE WHEREIN A BIT INDICATING WHETHER DATA IS IN CACHE IS RESET AFTER UPDATING FORWARD TABLE WITH PHYSICAL ADDRESS OF NON-VOLATILE MEMORY AND JETTISONING THE DATA FROM THE CACHE

(71) Applicant: Seagate Technology LLC, Cupertino, CA (US)

(72) Inventors: Thomas V. Spencer, Fort Collins, CO (US); Matthew Lovell, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 162 days.

(21) Appl. No.: 15/642,425

(22) Filed: Jul. 6, 2017

(65) Prior Publication Data

US 2019/0012114 A1 Jan. 10, 2019

(51) Int. Cl.
*G06F 12/0866* (2016.01)
*G06F 12/0888* (2016.01)

(52) U.S. Cl.
CPC ...... *G06F 12/0866* (2013.01); *G06F 12/0888* (2013.01); *G06F 2212/1016* (2013.01); *G06F 2212/214* (2013.01); *G06F 2212/7201* (2013.01)

(58) Field of Classification Search
None
See application file for complete search history.

(56) References Cited

U.S. PATENT DOCUMENTS

| 5,341,493 A * | 8/1994 | Yanai | G06F 11/1415 |
| | | | 711/161 |
| 6,804,741 B2 | 10/2004 | Cowan | |
| 7,844,778 B2 | 11/2010 | Shen et al. | |
| 8,495,299 B2 | 7/2013 | Fuller et al. | |
| 8,533,401 B2 | 9/2013 | Edirisooriya et al. | |
| 9,250,901 B2 | 2/2016 | Sodhi et al. | |
| 9,405,672 B2 | 8/2016 | Canepa et al. | |
| 2007/0143545 A1* | 6/2007 | Conley | G06F 12/0862 |
| | | | 711/129 |
| 2011/0055458 A1* | 3/2011 | Kuehne | G06F 12/0246 |
| | | | 711/103 |

(Continued)

*Primary Examiner* — Ann J Lo
*Assistant Examiner* — Chie Yew
(74) *Attorney, Agent, or Firm* — Hall Estill Attorneys at Law

(57) ABSTRACT

Method and apparatus for managing data buffers in a data storage device. In some embodiments, a write manager circuit stores user data blocks in a write cache pending transfer to a non-volatile memory (NVM). The write manager circuit sets a write cache bit value in a forward map describing the NVM to a first value upon storage of the user data blocks in the write cache, and subsequently sets the write cache bit value to a second value upon transfer of the user data blocks to the NVM. A read manager circuit accesses the write cache bit value in response to a read command for the user data blocks. The read manager circuit searches the write cache for the user data blocks responsive to the first value, and retrieves the requested user data blocks from the NVM without searching the write cache responsive to the second value.

19 Claims, 4 Drawing Sheets

(56) References Cited

U.S. PATENT DOCUMENTS

| | | | |
|---|---|---|---|
| 2012/0110247 A1* | 5/2012 | Eleftheriou | G06F 12/0246 711/103 |
| 2013/0339576 A1* | 12/2013 | Liu | G06F 12/0246 711/103 |
| 2014/0047170 A1 | 2/2014 | Cohen et al. | |
| 2014/0281315 A1* | 9/2014 | Danilak | G06F 11/1456 711/162 |
| 2017/0293554 A1* | 10/2017 | Grinberg | G06F 12/0253 |

* cited by examiner

BUFFER MANAGEMENT IN A DATA STORAGE DEVICE WHEREIN A BIT INDICATING WHETHER DATA IS IN CACHE IS RESET AFTER UPDATING FORWARD TABLE WITH PHYSICAL ADDRESS OF NON-VOLATILE MEMORY AND JETTISONING THE DATA FROM THE CACHE

SUMMARY

Various embodiments of the present disclosure are generally directed to the management of data in a memory buffer of a data storage device, such as but not limited to a solid state drive (SSD).

In some embodiments, a write manager circuit stores user data blocks in a write cache pending transfer to a non-volatile memory (NVM). The write manager circuit sets a write cache bit value in a forward map describing the NVM to a first value upon storage of the user data blocks in the write cache, and subsequently sets the write cache bit value to a second value upon transfer of the user data blocks to the NVM. A read manager circuit accesses the write cache bit value in response to a read command for the user data blocks. The read manager circuit searches the write cache for the user data blocks responsive to the first value, and retrieves the requested user data blocks from the NVM without searching the write cache responsive to the second value.

These and other features which may characterize various embodiments can be understood in view of the following detailed discussion and the accompanying drawings.

DETAILED DESCRIPTION

Figure 1:
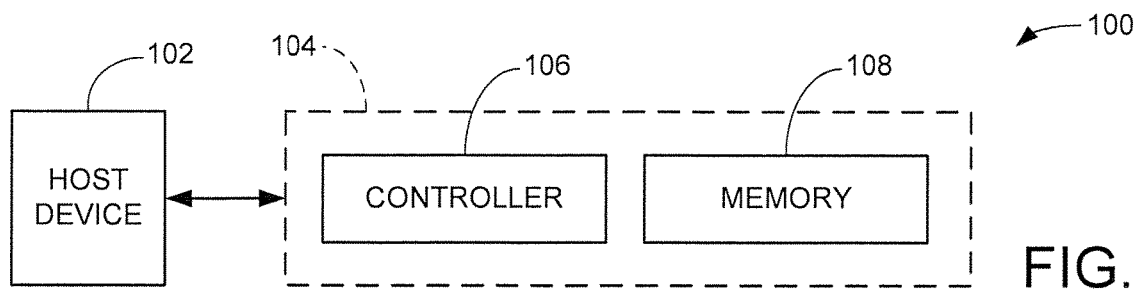
FIG. 1 provides a functional block representation of a data processing system in accordance with various embodiments.

The present disclosure generally relates to managing data stored in one or more data buffers of a data storage device.

Computerized data blocks are often stored in a non-volatile memory (NVM) of a data storage device, such as a flash memory of a solid state drive (SSD). The data blocks may be temporarily stored in one or more data buffers as part of the data transfer process. The data buffers may take a variety of forms such as a write cache, a read lookahead buffer, etc., and may be volatile or non-volatile as required. As will be appreciated, volatile memory retains programmed data only so long as operational power continues to be applied to the device, while non-volatile memory continues to retain the programmed data even after operational power has been removed.

Map structures are often used to track the physical locations of user data stored in the NVM of a storage device to enable the device to locate and retrieve previously stored data. Such map structures may associate logical addresses for the data blocks received from a host with physical addresses of the media, as well as other status information associated with the data.

The management of map structures can provide a processing bottleneck to a storage device controller in servicing access commands from a host device (e.g., read commands, write commands, status commands, etc.), as well as in performing internal housekeeping processes to relocate and recycle the memory (e.g., garbage collection operations, data promotion operations, etc.). Depending on granularity and workload, the map structures can be relatively large with many entries which are updated as new versions of data are written to new locations in the NVM. Additional processing resources may be required to ensure that accurate copies of the map data are maintained in the NVM, and that the needed map entries are efficiently and correctly retrieved for use.

Various embodiments of the present disclosure are generally directed to an apparatus and method for managing data in one or more data buffers of a data storage device, such as but not limited to an SSD. As explained below, some embodiments include an NVM, a controller circuit, a write cache and a read buffer.

The write cache stores processed writeback data received from a host device pending transfer to the NVM. The read buffer stores data retrieved from the NVM, such as read lookahead data that were speculatively fetched from the NVM pending a subsequent request from the host device based on current request sequencing. Depending on access latencies associated with the NVM, the read buffer may also retain previously requested read data for a time to reduce the need to perform another NVM access. While not necessarily limiting, it is contemplated that the write cache is configured to provide non-volatile data storage and the read buffer is configured to provide volatile data storage.

A forward map is stored in a local memory in the form of a data structure. The forward map describes the NVM using a number of entries that correlate logical addresses of user data blocks supplied by a host device for storage to the NVM with physical addresses of the user data blocks in the NVM.

The forward map includes a write cache bit value for each entry. The write cache bit values provide a status of the write cache and indicate a likelihood that a copy of an associated data block is resident in the write cache. The write cache bit values may be a single bit or multiple bits as desired.

During write operations in which data blocks are transferred from a host device to the NVM, the received data blocks are processed and stored in the write cache. The write cache bit values associated with the received data blocks are set to a first value in the forward map. A write command is scheduled and performed to transfer the data blocks from the write cache to the NVM. The forward map is updated to indicate the physical address(es) of the data blocks in the NVM. Once transferred, the data blocks are jettisoned from the write cache to accommodate new data, and the forward map is updated to transition the associated write cache bit values to a second value.

During a read operation, the controller circuit receives a request from the host device for one or more requested data blocks. In some cases, the controller circuit may initially access the read buffer in an effort to effect a cache hit and avoid further data accesses by transferring the data directly from the read buffer.

If the requested data blocks are not resident in the read buffer, the controller circuit accesses the map structure to determine the associated write cache bit value(s) for the requested data blocks. If the write cache bit values are set to the first value, the controller circuit accesses the write cache in an effort to locate the data blocks. If the requested data blocks are resident in the write cache, the controller circuit effects a cache hit by transferring the data blocks from the write cache to the host.

Should the data blocks not be found to be resident in the write cache, or should the write cache bit values be set to the second value for the requested data blocks, the controller circuit proceeds to request and obtain the requested data blocks from the NVM, and return the same to the host.

Generally, the first value for the write cache bit values indicates a high probability that the data blocks are still resident in the write cache. The second value for the write cache bit values conclusively indicates that the data blocks are not resident in the write cache. In this way, false positives may arise, but not false negatives.

This scheme provides operational advantages including reduced read latencies since most reads will not include an operation to access and search the write cache before retrieving the data from flash. A small footprint for the write cache bit values, including the use of just a single bit for each entry, maintains the map structure at a manageable size level. Accesses and updates involving the write cache bit values can be scheduled at appropriate times so that little or no additional processing complexity is added.

These and other features and advantages of various embodiments can be understood beginning with a review of FIG. 1 which provides a functional block representation of a data processing system 100. The system includes a host device 102 and a data storage device 104. The data storage device 104 includes a controller circuit 106 and a memory module 108.

The controller circuit 106 is a programmable processor and/or hardware based circuit that provides top level communication and control functions for data transfers to and from non-volatile memory (NVM) storage in the memory module 108. The data transfers between the host device and the data storage device may be provided via a selected protocol. The NVM can take any number of suitable forms including solid state memory (e.g., flash, XRAM, RRAM, STRAM, etc.) and/or rotatable media (e.g., magnetic recording discs, etc.).

Figure 2:
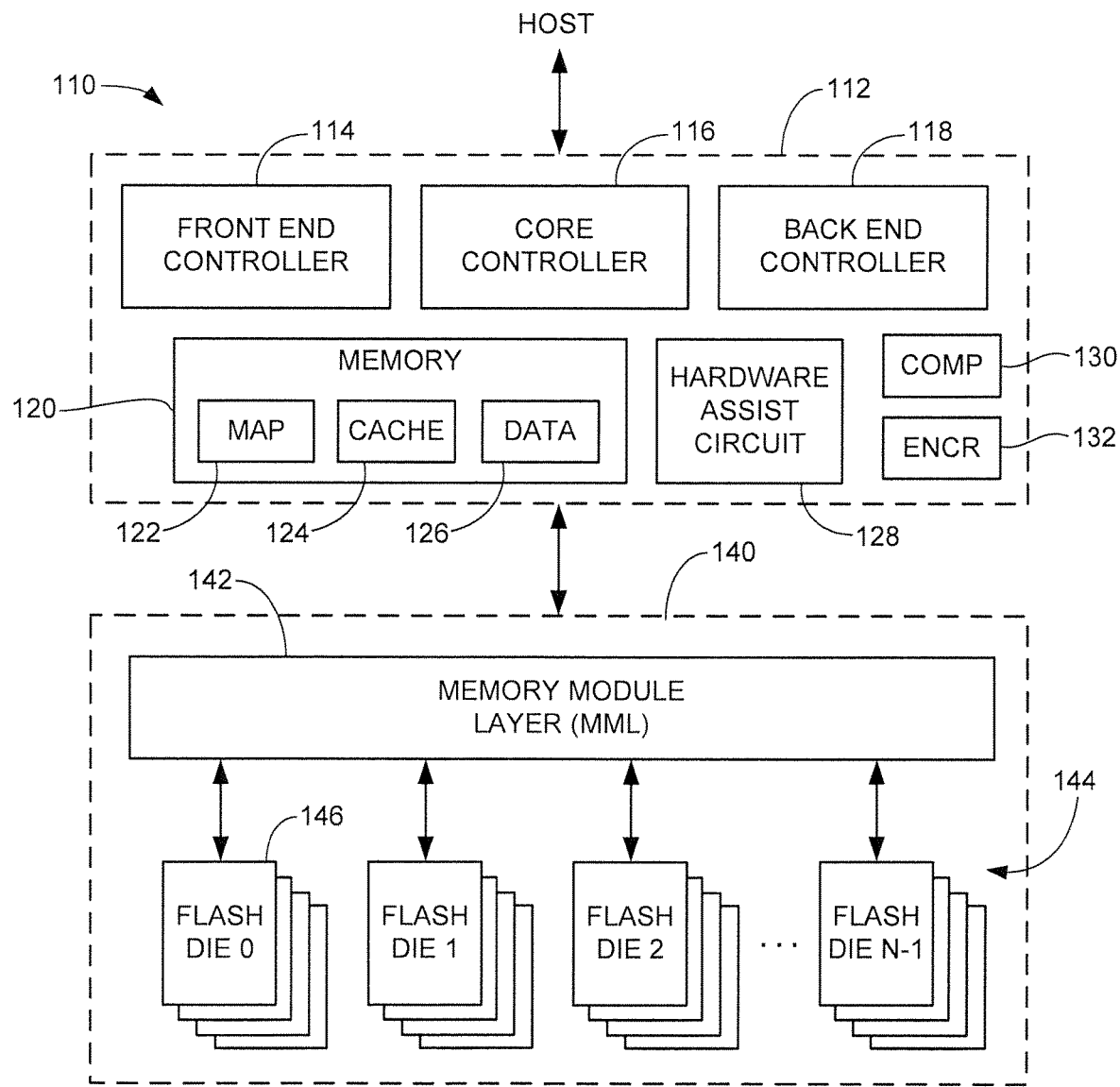
FIG. 2 shows aspects of the device of FIG. 1 characterized as a solid state drive (SSD) in accordance with some embodiments.

FIG. 2 shows a data storage device 110 generally corresponding to the device 104 in FIG. 1. The device 110 is configured as a solid state drive (SSD) that communicates with a host device such as 102 in FIG. 1 via one or more Peripheral Component Interface Express (PCIe) ports, although other configurations can be used.

The SSD 110 includes a controller circuit 112 and a memory module 114. The controller circuit 112 (hereinafter "controller") includes a front end controller 114, a core controller 116 and a back end controller 118. The front end controller 114 performs host I/F functions, the back end controller 118 directs data transfers with the memory module 114 and the core controller 116 provides top level control for the device.

Each controller 114, 116 and 118 includes a separate programmable processor with associated programming (e.g., firmware, FW) in a suitable memory location, as well as various hardware elements to execute data management and transfer functions. This is merely illustrative of one embodiment; in other embodiments, a single programmable processor (or less than three programmable processors) can be configured to carry out each of the front end, core and back end processes using associated FW in a suitable memory location. A pure hardware based controller configuration can also be used. The various controllers may be integrated into a single system on chip (SOC) integrated circuit device, or may be distributed among various discrete devices as required.

A controller memory 120 represents various forms of volatile and non-volatile memory (e.g., SRAM, DDR DRAM, flash, etc.) utilized as local memory by the controller 112. Various data structures and data sets may be stored by the memory including one or more map structures 122, one or more caches 124 for map data and other control information, and one or more data buffers 126 for the temporary storage of host (user) data during data transfers.

A non-processor based hardware assist circuit 128 may enable the offloading of certain memory management tasks by one or more of the controllers as required. The hardware circuit 118 does not utilize a programmable processor, but instead uses various forms of hardwired logic circuitry such as application specific integrated circuits (ASICs), gate logic circuits, field programmable gate arrays (FPGAs), etc.

Additional circuits that form the controller 112 may include a compression circuit 130 to perform data compression/decompression operations, and an encryption engine circuit 132 to perform various cryptographic functions such as encryption, decryption, hashes, signatures, etc. The compression and cryptographic functionality of these circuits may be realized in hardware and/or firmware, and may take various types as required.

FIG. 2 further shows a memory module 140 generally corresponding to the memory 104 in FIG. 1. The memory module 140 includes a memory module layer ("MML") and a flash memory array 144. The MML 142 includes read/write/erase (R/W/E) circuitry and other control circuitry incorporated into the memory module 140 to write data to the flash memory 144. The MML may be formed of one or more programmable processor circuits with associated programming in memory, and/or hardware circuits adapted to carry out various commands and data transfers with the controller 112.

The flash memory 144 includes a plural number N flash dies 146 (referred to as die 0 to die N−1). Any number of dies can be used, such as sixteen dies (e.g., N=16, etc). The MML 142 can operate to carry out parallel data transfer operations along each of the channels (lanes) established with the associated dies 146. Multiple channels may be established with each die (e.g., at a plane level) as required. The flash memory may be arranged as a single storage tier, or as multiple tiers.

While not limiting, it will be recognized by those skilled in the art that current generation SSDs and other data storage device systems can be formed from integrated memory modules such as 140 that are commercially available from a source of such devices. The memory modules may be integrated into an SSD by a device manufacturer which supplies the controller functions and tailors the controller to operate with the memory module. The controller and memory module are thus separate operational entities which communicate across one or more defined data and command interfaces. A "pull" system is commonly used in which the controller 112 issues commands and then repetitively checks (polls) the status of those commands by the memory module 140 to determine whether the commands have been completed.

Figure 3:
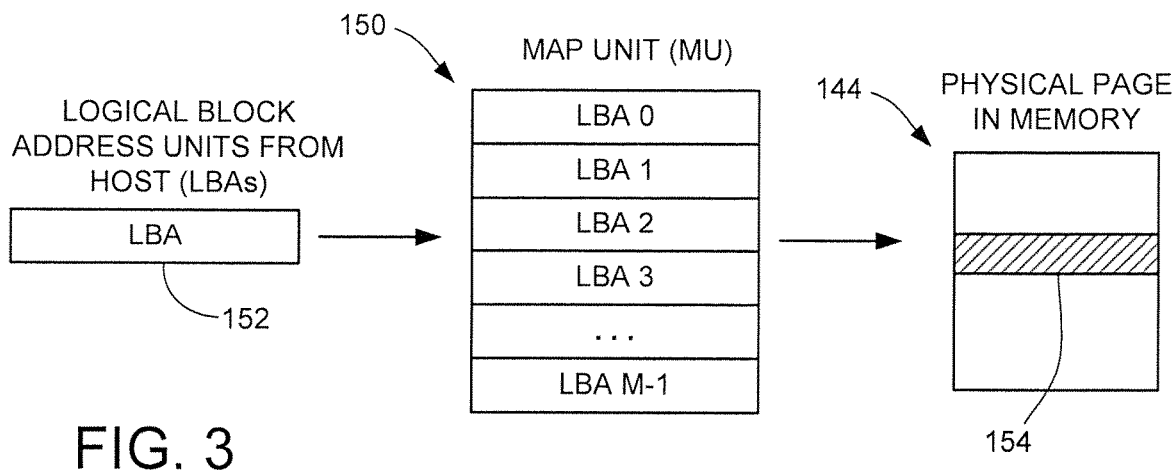
FIG. 3 illustrates a manner in which logical block address units (blocks or LBAs) are arranged into multi-block map units (MUs) for storage in the flash memory of FIG. 2 in some embodiments.

FIG. 3 shows an arrangement of a multi-block data structure referred to herein as a map unit (MU) 150. The map unit 150 represents a block of data of selected size formed from one or more input logical block address units 152 (LBAs) from the host 102. The LBAs 152 are logically referenced using a suitable host format (e.g., host LBA values, key-store values, virtual block addresses, etc.) and will generally have a fixed amount of user data. The MU 150 in turn forms a larger block of data. Data are written and read from the flash memory at the MU level (or greater). Exemplary sizes may be 512 bytes, B of user data in each of the LBAs 152 and 4 KB (4096 B) of user data in each MU 150, although other respective values may be used.

Depending on size, one or more MUs 150 are arranged for storage in a page 154 of the flash memory 144. The MUs may be provided with an associated map unit address (MUA) to identify the location of the associated MU. The flash dies 146 are arranged into garbage collection units (GCUs) of erasure blocks that span multiple dies. Erasure blocks represent the smallest increment of the flash memory that can be erased at one time. Each page represents a row of memory cells in a given erasure block that all share a common control line (e.g., word line) and thus represents the smallest increment of data that can be written or read at a time. Multiple pages of data can be written to the same row of memory cells using multi-level cell (MLC), three-level cell (TLC), four-level cell (FLC) techniques, etc. The page size can vary but common values include 8 KB, 16 KB, etc.

Figure 4:
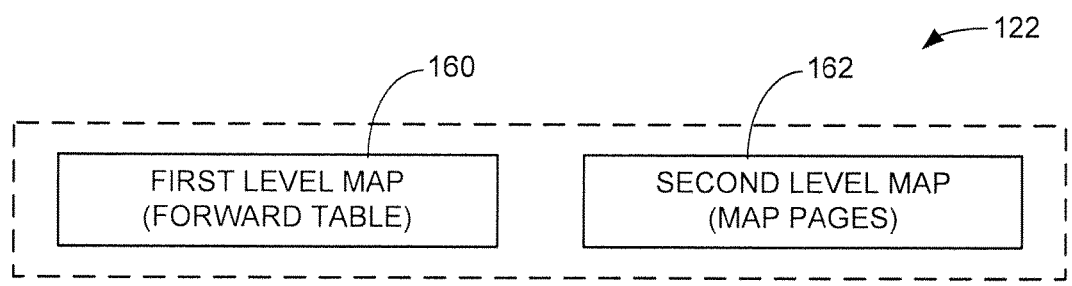
FIG. 4 shows an arrangement of a map structure used to locate the map units of FIG. 3 in some embodiments.

FIG. 4 shows an arrangement of the map 122 from FIG. 2 in accordance with some embodiments. The map 122 is characterized as a multiple level map with a first level map 160 and a second level map 162. Other arrangements can be used, including maps that have just a single level, maps with more than two levels or levels arranged in different ways, etc.

The first level map 160, also referred to as a forward table, generally provides entries to enable the association of logical addresses of data blocks to physical addresses in the flash memory 144. The logical addresses may take the form of LBAs, MUAs, etc., and the physical addresses may include information such as die, array, GCU, block, page, offset, etc.

The second level map 162 provides an arrangement of map pages, which describe groups of MUs. In some cases, the second level map 162 may be initially accessed to find the appropriate map page or pages that describe the desired MU(s), followed by accessing the first level map 160 to locate the desired MU(s) in the physical memory.

Figure 5:
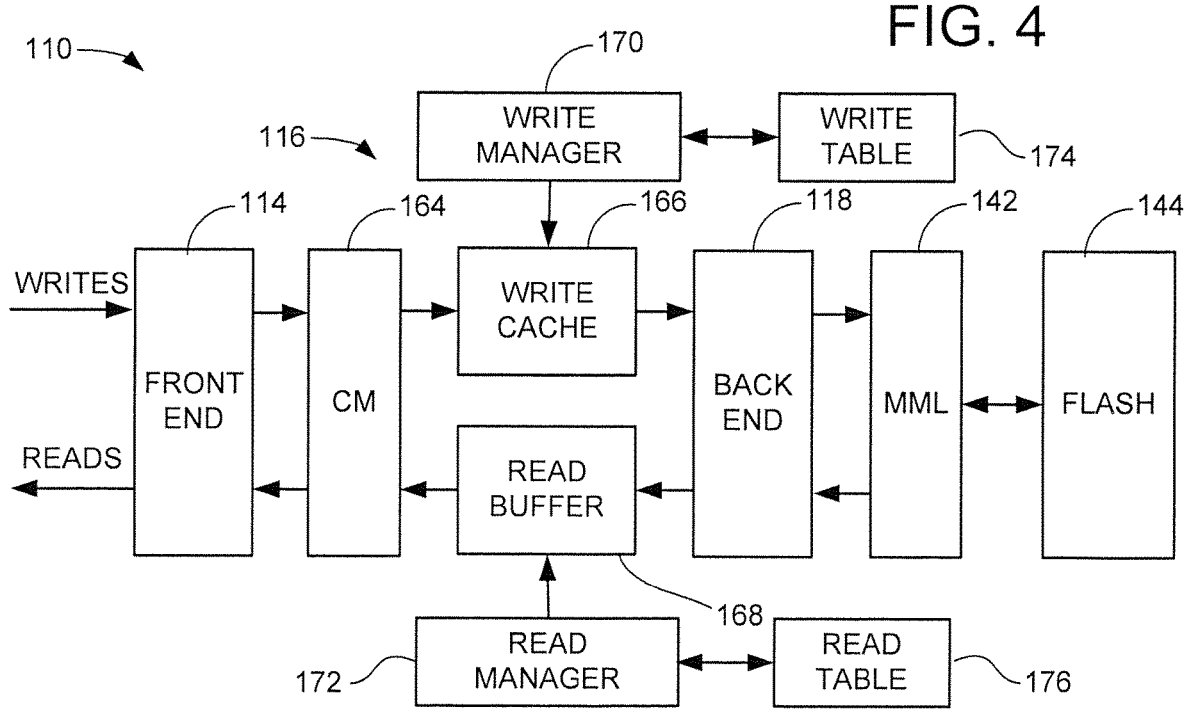
FIG. 5 shows a functional block diagram of further aspects of the SSD in some embodiments.

FIG. 5 shows aspects of the SSD 110 in further detail. The front end and back end processors 114, 118 are shown as separate blocks, as are the MML 142 and flash 144. Aspects of the core controller 116 include a collision monitor (CM) circuit 164, a write cache 166 and a read buffer 168. The write cache 166 is controlled by a write manager circuit 170, and the read buffer 168 is controlled by a read manager circuit 172.

The write cache and the read buffer are memory buffer circuits configured to temporarily store data during transfers between the host 102 and the flash 144. These respective memory buffer circuits may be physically realized in a variety of ways, including in one or more individual memory devices. In some cases, the buffers may be the same type of memory, such as DRAM, SRAM, etc., or may have different forms of construction. Power back up may be supplied in the form of stored charge in a capacitor or battery to configure the write cache as essentially a non-volatile memory. In other cases, solid-state non-volatile memory constructions may be used for the write cache such as flash, XRAM, NVRAM, etc. Other configurations may be used as well. In the present discussion, the write cache 166 will be contemplated as comprising non-volatile memory.

Write commands and the associated write data (generally, "writes") are processed along a first internal path, and read commands and associated read data (generally, "reads") are processed along a second internal path parallel to the first path. Write data from the host flows through the write cache 166 to the flash 144, and read data from the flash flows through the read buffer 168 to the host.

The CM circuit 164 monitors for overlapping commands to help ensure the commands are serviced in the appropriate sequence. The CM circuit filters or otherwise declares overlap conditions to ensure a read command is not processed for a previously provided (stale) version of write data.

In some embodiments, the write manager circuit 170 maintains a write cache table 174 as a data structure in local memory. The write manager circuit 170 uses the table 174 to track the locations and status of the various contents of the write cache. Similarly, the read manager circuit 172 may use a read buffer table 176 to track the locations and status of the various contents of the read cache. The tables 174, 176 enable the manager circuits 170, 172 to control the contents of the memory buffers 166, 168.

The processing of writes by the SSD 110 is relatively straightforward. The received data blocks associated with a given write command are processed into MUs 150, which may include the application of encryption and compression operations as well as the generation of various levels of error correction code (ECC) values. Ultimately, one or more pages worth of data are accumulated into the write cache 168 pending transfer to the NVM (flash 144).

The overall scheme is designed to get the received data blocks into the write cache as quickly as possible, since the write cache is non-volatile and the storage of the data in such memory helps ensure the data will not be lost should an inadvertent power down condition be experienced. Once stored in the non-volatile write cache, write manager can schedule the actual transfer of the data to the NVM (flash 144) at an appropriate time.

Depending on the extent to which the write cache is configured as non-volatile memory, there may be no time limit in the system with regard to how long the data may remain resident therein, either prior to being written to flash or after the data have been written to flash. Such time limits can be implemented, however, as required. In a writeback cache environment, the SSD 110 will have already communicated to the host device 102 a command completion status the moment the data are safely stored in the non-volatile write cache 168, to enable the host to proceed with issuing other data transfer commands. This allows the system to continue to provide emphasis on servicing read commands and schedule the writes at appropriate times. It follows that the write data may remain resident in the write cache 168 for a reasonably long period of time.

The processing of read commands by the SSD can vary as required. In some cases, all reads can be serviced directly from the flash 144. One problem with this approach is that the overall data transfer rate may be diminished since such commands require involvement of both the back end processor 118 and the associated MML 142 for the associated die or dies of the flash memory 144.

There can be a performance benefit to servicing read commands from data that are already locally stored in memory buffers such as the write cache 166 and the read buffer 168, since this can provide improved read latencies during read commands. One problem with this is that additional complexity is required to track and search these buffers. Significant resources are applied by the write manager circuit 170 to manage the contents of the write cache, and it is not necessarily a cost-free operation, from a resource standpoint, to determine the contents and location of data in the write cache 166 at any given time. It follows that a read access to ascertain the contents of the write cache 166 is not easily carried out, and may involve a search operation upon the write cache to determine the actual contents of a given set of data blocks.

Figure 6:
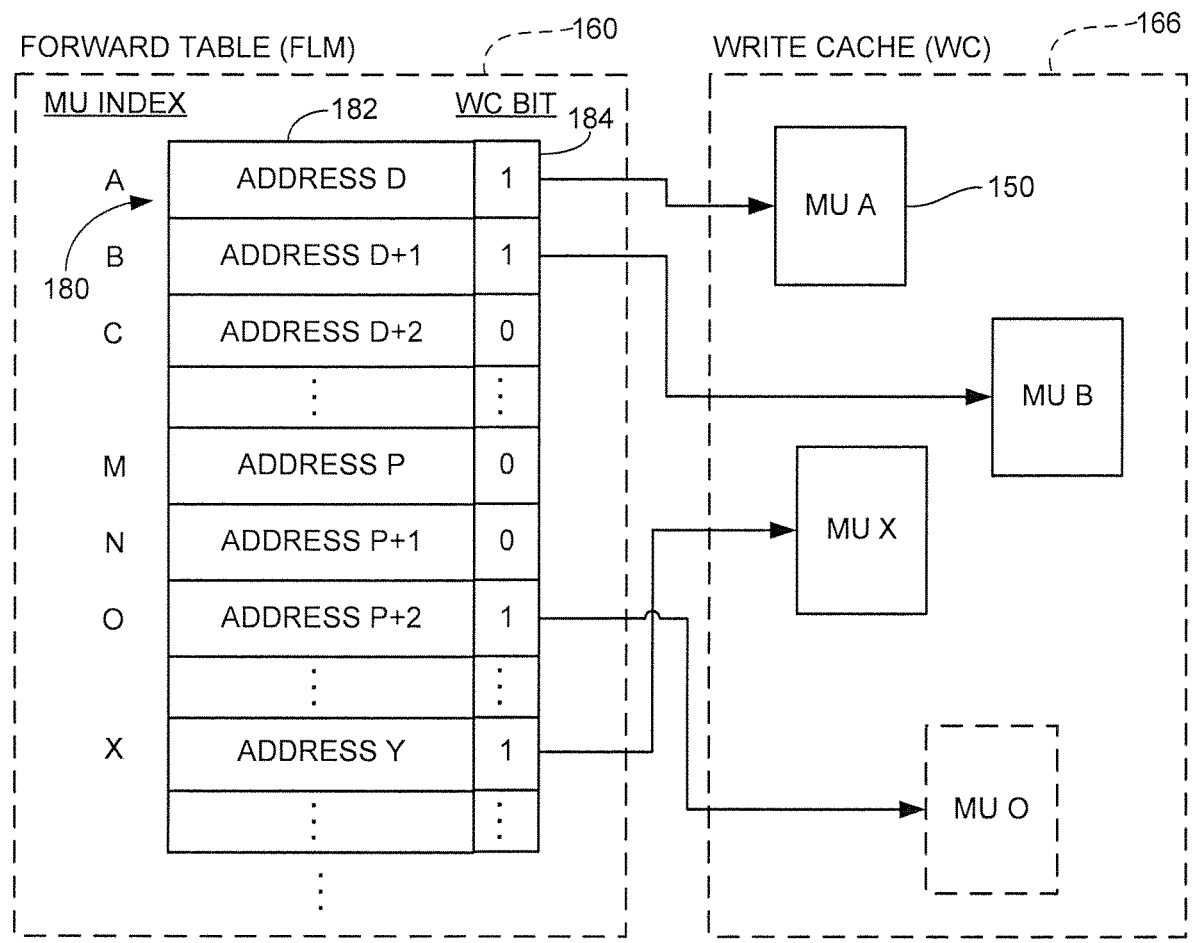
FIG. 6 shows an exemplary format for a forward table of the map structure of FIG. 4 used in accordance with some embodiments by the circuitry of FIG. 5.

Various embodiments of the present disclosure provide an enhanced map structure format to facilitate more efficient write cache management. In many cases, write cache searches can be avoided entirely when the likelihood is low that the requested data sets are in the write cache. FIG. 6 shows an exemplary format for the first level map, or the forward table 160 of FIG. 4 in accordance with some embodiments. The forward table 160 includes a number of entries 180, each of which is indexable by an input logical address. In the example of FIG. 6, it is MU addresses (e.g., MUAs) that are used as the input, but other indexes can be used including individual LBA values, etc.

Each entry 180 in the forward table 160 provides a physical address field 182 in the NVM (flash memory 144) at which the associated data (e.g., MU) is stored. As noted above, the entry may include a die address, a plane address, a GCU address, a page address and a bit offset address. Other information may be stored in each entry as well.

Each entry 180 further includes a write cache bit value field 184. In some embodiments, the write cache bit value field 184 may constitute a single bit, although more than one bit can be used. The write cache bit value generally provides two (or more) values, including a first value and a second value. The first value is configured to provide an indication that the associated data are, or may be, stored in the write cache 166. This may be represented by a bit value of "1" for the write cache bit value.

The second value is configured to provide an indication that the associated data are not stored in the write cache 166. This may be represented by a bit value of "0" for the write cache bit value. Each entry 180 has its own write cache bit value (WC bit). In the example of FIG. 6, the WC bit values indicate that MUs B, C, O and X are resident in the write cache 166.

The dotted box for MU O indicates that this MU has been written to flash and is no longer resident in the write cache 166. Hence, the first value (logical 1 in this example) provides a likelihood that the data are in the write cache, but false positives may occur. Based on the manner in which the WC bit values are updated, it is required that no false negatives will occur (e.g., a logical 0 confirms the data are not in the write cache).

The write manager circuit 166 accesses and manages the forward table 160 during the servicing of the write commands. In some cases, the forward table may be stored in a first memory (e.g. local processor memory, etc.) and individual entries may be loaded to a second memory for processing. The updates to the WC bit values may take place in the second memory, after which the WC bit values are reset before returning the entries to the first memory. In other cases, the write manager circuit may access, set and reset the WC bit values directly in the first memory.

Figure 7:
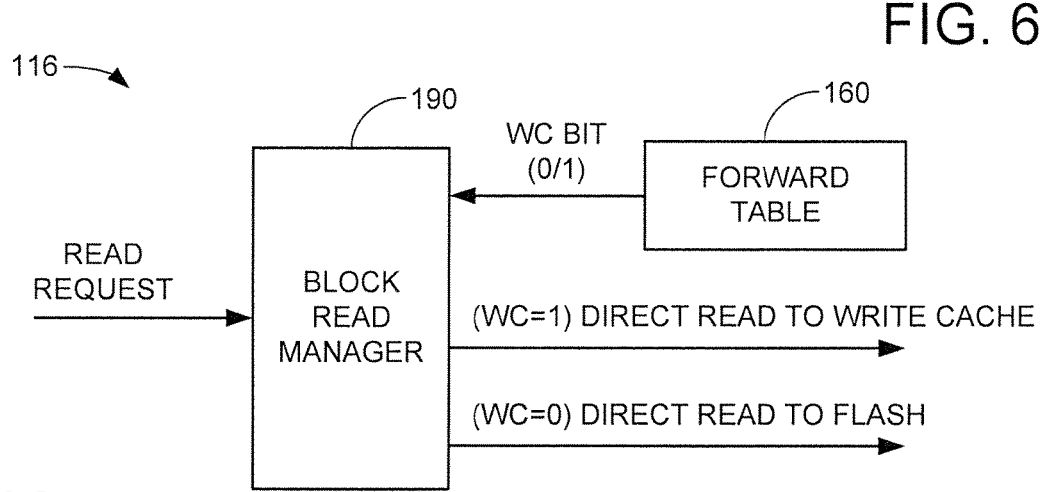
FIG. 7 shows further aspects of a block read manager circuit of the SSD.

FIG. 7 shows further aspects of the core controller 116 in some embodiments. A block read manager circuit 190, which may form a portion of the read manager circuit 172 in FIG. 5, accesses the forward table 160 responsive to receipt of a read request. The WC bit value is returned (0 or 1). If the bit value is "1" (WC=1), the read request is directed to the write cache. If the bit value is "0" (WC=0), the read request is directed to flash.

Figure 8:
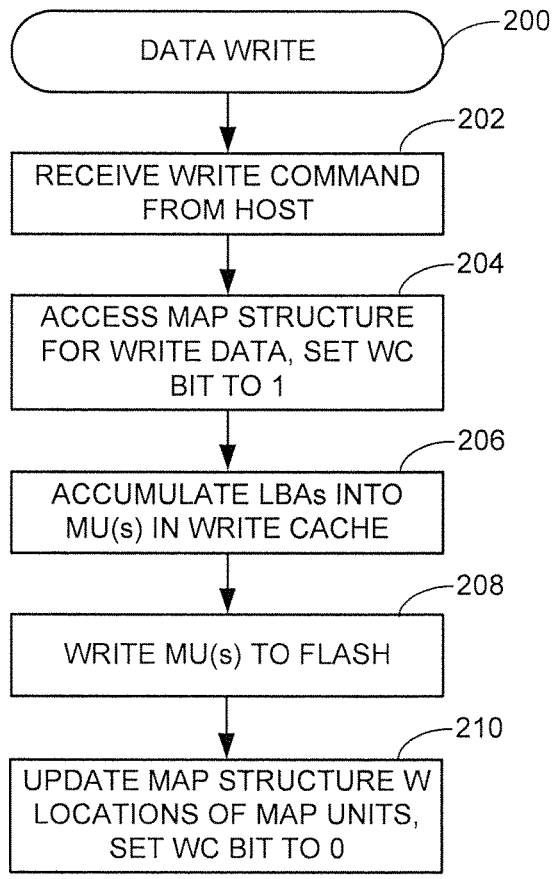
FIG. 8 is a flow chart for a write routine illustrative of steps carried out by the SSD in accordance with some embodiments to perform data write (programming) operations with the flash memory.
Figure 9:
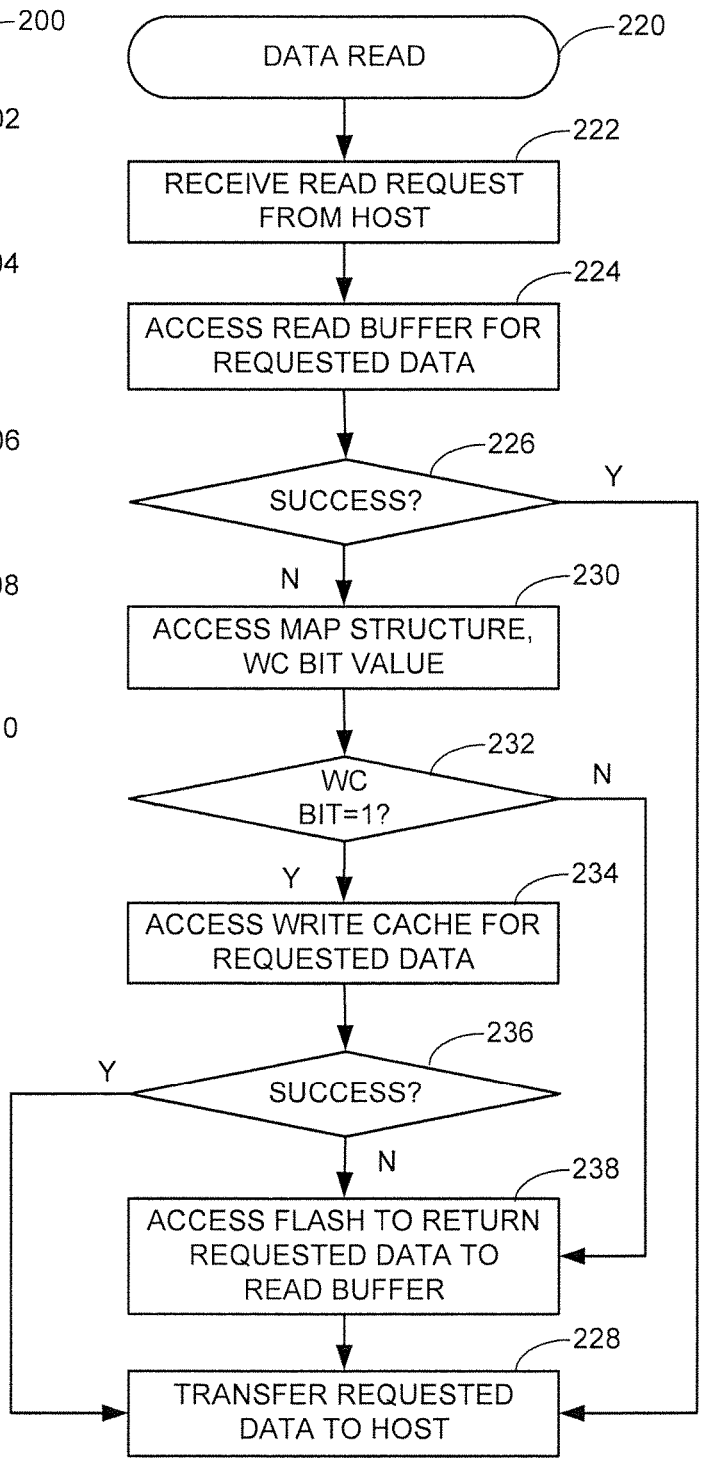
FIG. 9 is a flow chart for a read routine illustrative of steps carried out by the SSD in accordance with some embodiments to perform data read (retrieval) operations with the flash memory.

FIGS. 8 and 9 provide flow charts to illustrate the manner in which writes and reads can be processed by the SSD 110 using the WC bit values in some embodiments. The respective flows may represent programming steps (e.g., firmware) stored in memory and executed by one or more processors. The routines are exemplary so that other processing flows can be enacted, including additional steps, steps in a different order, etc.

FIG. 8 is a data write routine 200 which commences responsive to receipt of a write command from the host device 102, as indicated by step 202. The command may include a write request as well as one or more blocks of user data (e.g., LBAs) to be written to the NVM.

The forward table map structure 160 is accessed at step 204 to initially set the WC bit. While not required, other information from the map structure can be obtained as well. The entry 180 may be retrieved to a local buffer or cache, and may require one or more second level map accesses before the entry can be located and loaded. The WC bit value for the entry 180 is updated at this time to the first value (in this case, logical 1).

The received blocks (LBAs) are assembled into one or more map units (MUs) in the write cache at step 206. While not shown, a write command complete notification may be transferred to the host to signal the completion of the write command to the host, to enable the host to move on to a subsequent command.

The writing of the MU(s) is scheduled and executed at step 208. Depending on workload and operational parameters, there may be a delay from the command completion notification and the actual transfer of the data to the flash. Once the transfer to flash has been completed, the map structure entry 180 is updated to reflect the new physical address of the MU(s) at step 210. The WC bit value is also reset to the second value (logical 0).

FIG. 9 shows a data read routine 220 illustrative of steps carried out in some embodiments to read data from the SSD 110 using the WC bit values set during the routine of FIG. 8. As before, the routine is merely exemplary and can take other forms.

A read request is received from the host in the form of a read command at step 222. This may include a command portion and logical addresses (LBAs) for one or more blocks of data.

The read manager circuit 172 (which may include the block read circuit 190 in FIG. 7) operates to access the read buffer at step 224 to determine whether the requested data are in the read buffer. This may take place using the read table 176, or some other mechanism. In some cases, look ahead speculative reads may be have been performed by the read manager based on existing sequential workloads in anticipation of an upcoming request for the data.

Decision step 226 determines whether this accessing of the read lookahead buffer was successful; if so, the requested data are returned to the host at step 228.

Should the requested data not be resident in the read buffer, the flow passes to step 230 where the map structure for the request data is accessed; this will involve locating and retrieving one or more entries 180 of the forward map 160 associated with the requested data. At this time, the WC bit value 184 for each entry is retrieved as well and evaluated.

If WC=1, as indicated by decision step 232, the flow passes to step 234 where the write cache is accessed to search for the requested data. This can take a variety of forms, such as accessing the write cache table 174 (FIG. 5) or performing an actual search of the write cache. Should this search be successful, decision step 236, the data are thereafter transferred from the write cache at step 228. It will be noted that the read manager circuit 168 may communicate a request to the write manager circuit 166 to determine whether the desired blocks are present.

On the other hand, if either the WC bit value is set to the second value (WC=0), or if the data are not in fact located in the write cache (false positive), the flow passes to step 238 where the read command is forwarded to the back end processor and flash to retrieve the requested data, using the address information from the forward table. Once retrieved, the data are transferred to the host.

In this scheme it will be noted that, generally, the WC bit value is set to the first value (logical 1) substantially when the write data are first received and the associated forward table map entry 180 is accessed and loaded. No separate data access is required other than to read the bit of the WC bit value for each entry. Similarly, the WC bit value is not reset to the second value (logical 0) until the data have been written to the NVM and the map entry 180 has been updated with the new address information. As before, this can be easily carried out at the time of the updating of the entry.

Other arrangements can be used, however; for example, the processing of the map entries may be such that the core controller 116 does not clear the command until the command is complete and the map entry is released to be replaced by another, different map entry. Depending on the size of the forward map, an entire copy of the forward map may be loaded locally to processor volatile memory to enable fast accesses for both writes and reads, with journaled copies of the forward map periodically saved to NVM. Because write data will only be resident in the write cache for a relatively short time, the steady state values for the WC bit values in the forward map, wherever stored (e.g., local memory, NVM, etc.) should be the default second value (WC=0), and only at the first value (WC=1) for a period of time that roughly corresponds to the time during which the data are in fact resident in the write cache.

If a flash write cache is used, the fact that the memory is erasable means that the write manager circuit 170 will routinely recycle the old write data via garbage collection to erase blocks to accommodate new data sets. In some cases, the system can be configured to not reset the WC bit value until such time that the associated data have in fact been recycled and removed (erased) from the write cache. In other cases, the recycling operation may occur prior to the resetting of the WC bit value. If a write-in-place write cache is used, then the existing write data may simply be overwritten with new data and the WC bit value set accordingly.

The foregoing embodiments can provide a number of advantages. The WC bit values increase the size of the forward table, but by a negligible amount and provide a convenient and useful write cache status indication that can be used during reads to assess the status of the write cache.

While embodiments have been described in the environment of an SSD, such is not limiting as any form of NVM memory, such as rotatable media, hybrid devices, etc. can be used. Flash is suitable for both the NVM and the write cache, but other forms of solid-state memory can be used including but not limited to spin-torque transfer random access memory (STRAM), resistive random access memory (RRAM), phase change random access memory (PCRAM), magnetic random access memory (MRAM), battery or capacitor backed up memory (e.g., NVRAM, DRAM, SRAM), etc. Moreover, while the write cache is contemplated as comprising non-volatile memory, a volatile write cache (or portions thereof) can also be used.

It is to be understood that even though numerous characteristics and advantages of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. An apparatus comprising:
a write cache characterized as an erasable, non-volatile cache;
a write manager circuit configured to, responsive to receipt of a write command from a host, temporarily store user data blocks in the write cache pending transfer to a non-volatile memory (NVM) and set a write cache bit value to a first value, the write manager circuit further configured to set the write cache bit value to a second value responsive to a completion of the transfer of the user data blocks from the write cache to the NVM, the write cache bit value forming a portion of an entry in a forward table arranged as a data structure in a memory that associates a logical address of the user data blocks with a physical address in the NVM;
and a read manager circuit configured to, responsive to receipt of a read command from the host, access the write cache bit value, search the write cache to locate the user data blocks for transfer to the host responsive to the write cache bit value being set to the first value, and retrieve the user data blocks from the NVM without searching the write cache responsive to the write cache bit value being set to the second value, the write manager circuit further configured to change the write cache bit value to the second value after updating the forward table to identify the physical address in the NVM to which the user data blocks were transferred and after jettisoning the user data blocks from the non-volatile cache.

2. The apparatus of claim 1, wherein the write manager circuit loads the entry of the forward table from a first memory to a second memory and sets the write cache bit value to the first value responsive to receipt of the write command.

3. The apparatus of claim 1, wherein the erasable, non-volatile cache comprises flash memory, the write manager further applies a garbage collection operation to erase the user data blocks from the flash memory to accommodate new data blocks, and the write manager changes the write cache bit value to the second value after the garbage collection operation is completed.

4. The apparatus of claim 2, wherein the read manager circuit accesses the second memory to read the write cache bit value.

5. The apparatus of claim 1, wherein the write cache bit value constitutes a single bit that is appended to an address field of the entry that describes the physical address in the NVM at which a prior version of the user data blocks is stored.

6. The apparatus of claim 1, wherein the read manager circuit is further configured to search a read lookahead buffer for the user data blocks responsive to the read command prior to accessing the write cache bit value.

7. The apparatus of claim 1, in combination with the NVM, the NVM characterized as a flash memory.

8. The apparatus of claim 1, wherein the write manager circuit and the read manager circuit form a portion of a controller circuit comprising one or more programmable processors that utilize programming steps stored in a memory.

9. A data storage device, comprising:
a non-volatile memory (NVM) configured to store user data blocks supplied by a host coupled to the data storage device;
a write cache configured to temporarily store groups of the user data blocks pending transfer to the NVM responsive to receipt of one or more write commands from the host, the write cache comprising flash memory;
a forward table stored as a data structure in a memory that associates logical addresses of the user data blocks with physical addresses in the NVM at which the user data blocks are stored, the forward table configured as a plurality of entries, each entry indexable by an associated logical address and having an address field that describes the corresponding physical address in the NVM and a write cache bit value;
a write manager circuit configured to set the write cache bit value to a first value for one or more entries of the forward table associated with each of the groups of the user data blocks placed into the write cache pending transfer to the NVM, the write manager circuit further configured to reset the write cache bit value from the first value to a second value after the transfer of each of the groups of the user data blocks from the write cache to the NVM and after each of the groups of the user data blocks have been erased from the flash memory using a garbage collection operation;
and a read manager circuit configured to, responsive to receipt of a read command from the host associated with a selected group of the user data blocks, access the write cache bit value for the one or more entries associated with the selected group of the user data blocks, retrieve the selected group of the user data blocks from the write cache for transfer to the host responsive to the write cache bit value being set to the first value, and retrieve the selected group of the user data blocks from the NVM responsive to the write cache bit value being set to the second value;
wherein the write manager further resets the write cache bit value from the first value to the second value after the forward table have been updated to identify the physical addresses in the NVM at which each of the groups of the user data blocks have been written.

10. The data storage device of claim 9, wherein the write manager circuit loads the entry of the forward table from a first memory to a second memory and sets the write cache bit value to the first value responsive to receipt of the write command.

11. The data storage device of claim 10, wherein the read manager circuit forwards the read command to the NVM without searching the write cache responsive to the write cache bit value being set to the second value.

12. The data storage device of claim 10, wherein the write cache bit value constitutes a single bit that is appended to an address field of the entry that describes the physical address in the NVM at which a prior version of the user data blocks is stored.

13. The data storage device of claim 9, characterized as a solid state drive (SSD).

14. The data storage device of claim 9, wherein the write cache comprises flash memory.

15. The data storage device of claim 9, wherein the NVM comprises flash memory.

16. A method comprising:
storing user data blocks in a non-volatile, erasable write cache pending transfer to a non-volatile memory (NVM) responsive to a write command from a host;
setting a write cache bit value to a first value responsive to the storing step, the write cache bit value forming a portion of an entry in a forward table arranged as a data structure in a memory that associates a logical address of the user data blocks with a physical address in the NVM;
transferring the user data blocks from the write cache to the NVM;
performing a garbage collection operation to erase the user data blocks from the write cache to prepare the write cache for receipt of new user data blocks;
resetting the write cache bit value to a second value responsive to completion of the transferring step and the performing step;
accessing the write cache bit value responsive to a read command from the host;
retrieving the user data blocks to the host from the write cache or the NVM responsive to the write cache bit value being set to the first value or the second value, respectively; and
resetting the write cache bit value from the first value to the second value after the forward table have been updated to identify the physical addresses in the NVM at which each of the user data blocks have been written.

17. The method of claim 16, wherein the retrieving step comprises searching the write cache for the user data blocks responsive to the write cache bit value being set to the first value, and transferring the user data blocks from the write cache to the host responsive to the user data blocks being located in the write cache.

18. The method of claim 16, wherein the retrieving step comprises forwarding the read command to the NVM without searching the write cache responsive to the write cache bit value being set to the second value.

19. The method of claim 18, wherein the retrieving step further comprises forwarding the read command to the NVM without searching the read cache.

* * * * *